United States Patent
Hashimoto et al.

(10) Patent No.: US 11,810,567 B2
(45) Date of Patent: Nov. 7, 2023

(54) SPEECH RECOGNITION DEVICE, SPEECH-RECOGNITION-DEVICE COORDINATION SYSTEM, AND SPEECH-RECOGNITION-DEVICE COORDINATION METHOD

(71) Applicant: MAXELL, LTD., Kyoto (JP)

(72) Inventors: Yasunobu Hashimoto, Kyoto (JP); Ikuya Arai, Kyoto (JP); Satoru Takashimizu, Kyoto (JP); Kazuhiko Yoshizawa, Kyoto (JP); Hiroshi Shimizu, Kyoto (JP); Sadao Tsuruga, Kyoto (JP); Osamu Kawamae, Kyoto (JP)

(73) Assignee: MAXELL, LTD., Kyoto (JP)

( * ) Notice: Subject to any disclaimer, the term of this patent is extended or adjusted under 35 U.S.C. 154(b) by 57 days.

(21) Appl. No.: 17/044,385

(22) PCT Filed: Apr. 9, 2018

(86) PCT No.: PCT/JP2018/014950
§ 371 (c)(1),
(2) Date: Oct. 1, 2020

(87) PCT Pub. No.: WO2019/198132
PCT Pub. Date: Oct. 17, 2019

(65) Prior Publication Data
US 2021/0104242 A1  Apr. 8, 2021

(51) Int. Cl.
 G10L 15/26 (2006.01)
 G10L 15/08 (2006.01)
 G06V 40/16 (2022.01)
(52) U.S. Cl.
 CPC ............ *G10L 15/26* (2013.01); *G06V 40/172* (2022.01); *G10L 15/08* (2013.01); *G10L 2015/088* (2013.01)

(58) Field of Classification Search
None
See application file for complete search history.

(56) References Cited

U.S. PATENT DOCUMENTS 10,083,006 B1 * 9/2018 Feuz .................. G06N 20/00
10,339,957 B1 * 7/2019 Chenier ............. H04L 67/306
(Continued)

FOREIGN PATENT DOCUMENTS

EP       3110118 A1    12/2016
JP    2008-053989 A    3/2008
(Continued)

OTHER PUBLICATIONS

Partial Supplementary European Search Report received in corresponding European Application No. 18914323.3 dated Oct. 20, 2021.
(Continued)

*Primary Examiner* — Nafiz E Hoque
(74) *Attorney, Agent, or Firm* — Mattingly & Malur, PC

(57) ABSTRACT

A speech recognition device includes a sound input section, a sound output section, a communication control section that performs data transmission and reception with at least one of other recognition devices, a conversation-mode executing section that transmits sound data input to each of the other recognition devices and outputs sound data received from each of the other recognition devices, a speech recognition section that converts the sound input into text data, a hot word detecting section that detects a conversation activation hot word from the text data to activate the conversation-mode executing section, and a command transmitting section that transmits a control command to each of the other recognition devices. If the hot word detecting section detects the conversation activation hot word, the command transmitting section transmits the control command to activate a (Continued)

conversation-mode executing section provided in each of the other recognition devices.

13 Claims, 14 Drawing Sheets

(56) References Cited

U.S. PATENT DOCUMENTS

| | | | |
|---|---|---|---|
| 10,706,845 B1* | 7/2020 | Devaraj | ................. G10L 15/30 |
| 10,735,479 B2* | 8/2020 | Padilla | ................. H04L 12/282 |
| 11,172,001 B1* | 11/2021 | Puthucode Krishnamoorthy ........ | |
| | | | G10L 13/08 |
| 2013/0073286 A1 | 3/2013 | Bastea-Forte et al. | |
| 2014/0163977 A1 | 6/2014 | Hoffmeister et al. | |
| 2014/0172953 A1 | 6/2014 | Blanksteen | |

FOREIGN PATENT DOCUMENTS

| | | |
|---|---|---|
| JP | 2008-067310 A | 3/2008 |
| JP | 2008-306620 A | 12/2008 |
| JP | 2010-098598 A | 4/2010 |
| JP | 2013-068952 A | 4/2013 |
| JP | 2015-156586 A | 8/2015 |
| JP | 2015-537258 A | 12/2015 |
| JP | 2017-143476 A | 8/2017 |
| JP | 2017-163249 A | 9/2017 |

OTHER PUBLICATIONS

International Search Report of PCT/JP2018/014950 dated May 22, 2018.

* cited by examiner

FIG. 6

| SPEAKING PERSON | DEVICE 1A | DEVICE 1B | DEVICE 1C | DEVICE 1D | DEVICE 1E | DEVICE 1F |
|---|---|---|---|---|---|---|
| A | 0 | 0 | 0 | 0 | 1 | 0 |
| B | 0 | 0 | 1 | 0 | 0 | 0 |
| C | 0 | 0 | 1 | 0 | 0 | 0 |
| D | 0 | 0 | 0 | 0 | 0 | 1 |

※ 0: ESTIMATED TO BE NOT NEAR THE TERMINAL
1: ESTIMATED TO BE NEAR THE TERMINAL

※ ASSUMPTION OF TERMINALS:
1A-1D: SMART SPEAKER OF ROOM OF EACH PERSON (i.e. IN ROOM)
1E-1F: SMARTPHONE OF EACH PERSON (i.e. OUT OF ROOM)

FIG. 13

| SPEAKING PERSON | DAY OF WEEK | TIME PERIOD | DEVICE 1A | DEVICE 1B | DEVICE 1C | DEVICE 1D |
|---|---|---|---|---|---|---|
| A | MON-FRI | 20:00-08:00 | 30 | 70 | 0 | 0 |
| A | MON-FRI | 08:00-20:00 | 5 | 5 | 0 | 80 |
| A | SAT, SUN | 20:00-08:00 | 30 | 70 | 0 | 0 |
| A | SAT, SUN | 08:00-20:00 | 30 | 50 | 0 | 10 |

FIG. 14

| ADDRESSED PERSON | DAY OF WEEK | TIME PERIOD | DEVICE 1A | DEVICE 1B | DEVICE 1C | DEVICE 1D |
|---|---|---|---|---|---|---|
| A | MON-FRI | 20:00-08:00 | 2 | 1 | 3 | 3 |
| A | MON-FRI | 08:00-20:00 | 2 | 2 | 3 | 1 |
| A | SAT, SUN | 20:00-08:00 | 2 | 1 | 3 | 3 |
| A | SAT, SUN | 08:00-20:00 | 2 | 1 | 4 | 3 |

SPEECH RECOGNITION DEVICE, SPEECH-RECOGNITION-DEVICE COORDINATION SYSTEM, AND SPEECH-RECOGNITION-DEVICE COORDINATION METHOD

TECHNICAL FIELD

The present invention relates to a speech recognition device, a speech-recognition-device coordination system, and a speech-recognition-device coordination method.

BACKGROUND ART

In recent years, speech recognition devices, so-called smart speakers or AI speakers, that use speech recognition technologies and artificial intelligence technologies are being productized. Such speech recognition devices recognize the content of sounds uttered by a speaking person, and analyze the spoken content. Thereby, the speech recognition devices output, from attached speakers, sounds of responses according to the spoken content. For example, Patent Literature 1 includes a description about one example of the speech recognition technologies that "To provide a method which presents candidate interpretations resulting from application of speech recognition algorithms to spoken input, in a consolidated manner that reduces redundancy, it is configured to present a user with an opportunity to select among the candidate interpretations and to present these alternatives without duplicate elements" (excerpted from the abstract). In addition, Patent Literature 2 includes a description that "in order to predict when a user is likely to utilize the system, the use of speech recognition models and data may be tracked as features for managing it in automated speech recognition systems" (excerpted from the abstract).

CITATION LIST

Patent Literatures

Patent Literature 1: Japanese Patent Application Laid-Open No. 2013-68952
Patent Literature 2: Japanese Unexamined Patent Application Publication (Translation of PCT Application) No. 2015-537258

SUMMARY OF INVENTION

Technical Problem

The speech recognition devices described above such as smart speakers receive a sound instruction and the like from a person around the devices, and process the sound instruction and the like to thereby obtain responses, but neither of the patent literatures disclose use of a plurality of speech recognition devices in a coordinated manner. That is, in example use at home, family members share a device in a living room, and if acquisition of information such as a weather forecast, news, or music that is on the Internet is requested, only content corresponding to the request is output as sounds. It is not supposed in the patent literatures that some communication or coordination operation is performed between the device and a still another speech recognition device that is in a room other than the living room, for example a child's room. Because of this, it is not possible to use a plurality of speech recognition devices in a coordinated manner, and there is room for contrivance in terms of new use modes of speech recognition devices.

The present invention has been contrived in view of the circumstance described above, and an object of the present invention is to provide a speech recognition device, a speech-recognition-device coordination system, and a speech-recognition-device coordination method that allow for use of a plurality of speech recognition devices in a coordinated manner.

Solution to Problem

In order to achieve the object described above, the present invention has configurations described in CLAIMS.

Advantageous Effects of Invention

According to the present invention, a speech recognition device, a speech-recognition-device coordination system, and a speech-recognition-device coordination method that allow for use of a plurality of speech recognition devices in a coordinated manner can be provided. Objects, configurations, and effects other than those described above are made apparent through embodiments described below.

BRIEF DESCRIPTION OF DRAWINGS

FIG. 6 is a figure illustrating one example of presence estimation data.
FIG. 13 is a figure illustrating one example of usage data that is a record of usage in different time periods for a person.
FIG. 14 is a figure illustrating one example of call priority order data that is a record of priority orders of devices to be called in different time periods for a person.

DESCRIPTION OF EMBODIMENT

In the following, examples of embodiments of the present invention are explained by using the drawings. Note that identical functions in various types of drawings are given the same reference signs, and overlapping explanation is omitted.

First Embodiment

Figure 1:
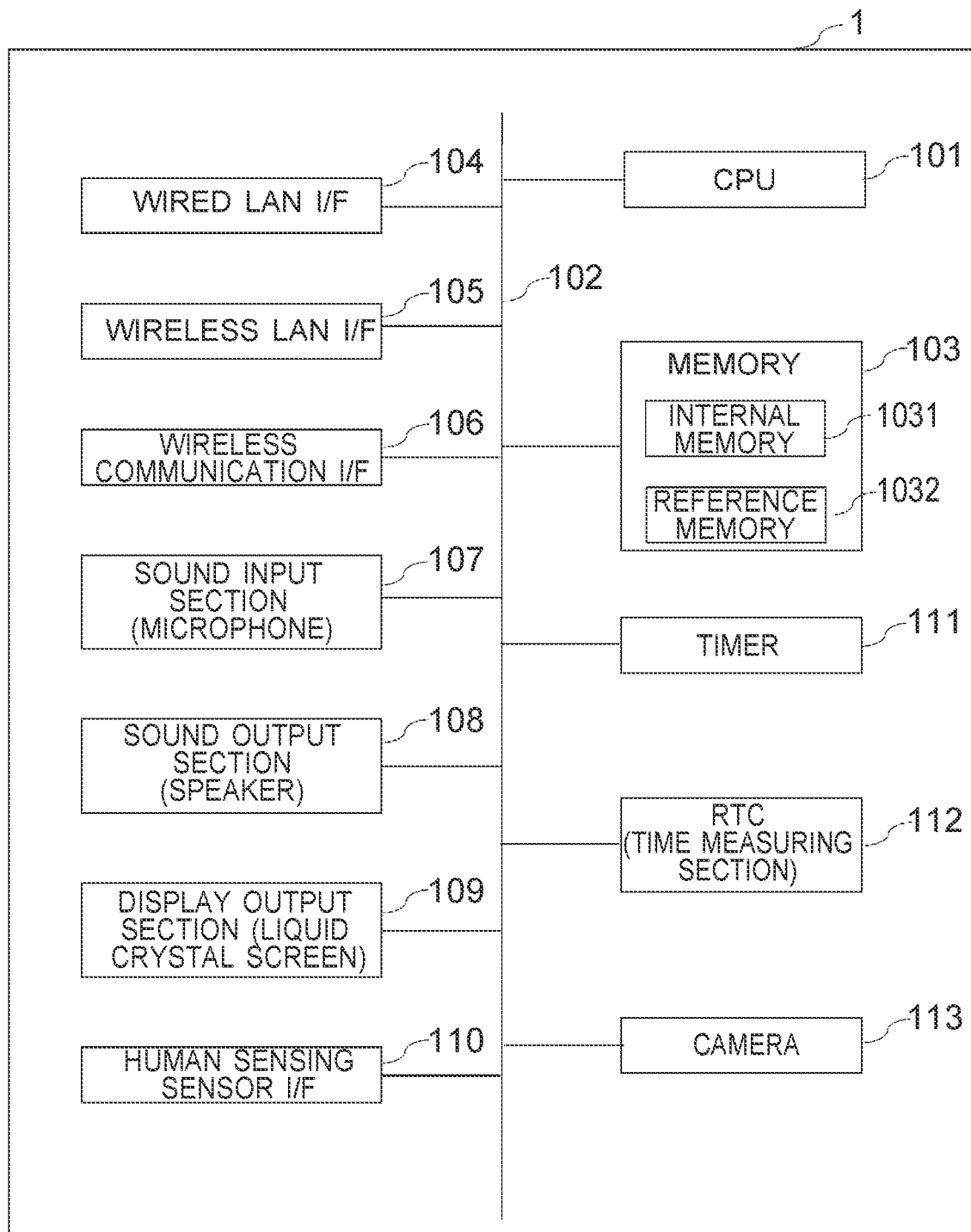
FIG. 1 is a hardware configuration diagram of a speech recognition device according to the present embodiment.

FIG. 1 is a hardware configuration diagram of a speech recognition device 1 according to the present embodiment. The speech recognition device 1 may be an apparatus dedicated for speech recognition or may be a conventionally existing electronic device having communication functions such as a mobile phone terminal, a smartphone, a personal computer, or a game console. In addition, the speech recognition device 1 may use, as the communication functions, typical communication functions such as wired LAN, wireless LAN, wireless communication through mobile phone lines, Bluetooth (registered trademark), or near-field wireless communication such as RFID, and includes one or more communication interfaces supporting the communication functions.

Specifically, in the speech recognition device 1, a CPU 101, a memory 103, a wired LAN I/F 104, a wireless LAN I/F 105 and a wireless communication I/F 106 as external interfaces, a sound input section 107 (e.g. a microphone), a sound output section 108 (e.g. a speaker), and a display output section 109 (e.g. a liquid crystal screen) are connected with each other via a bus 102. In addition, the bus 102 may be connected with a human sensing sensor I/F 110, a timer 111, an RTC 112, and a camera 113.

The memory 103 includes an internal memory 1031 formed with a volatile memory, and a reference memory 1032 formed with a non-volatile memory.

The human sensing sensor I/F 110 is an I/F for external attachment of a human sensing sensor for whatever type of sensor such as a human sensor or a sound collecting sensor, for example.

Figure 2:
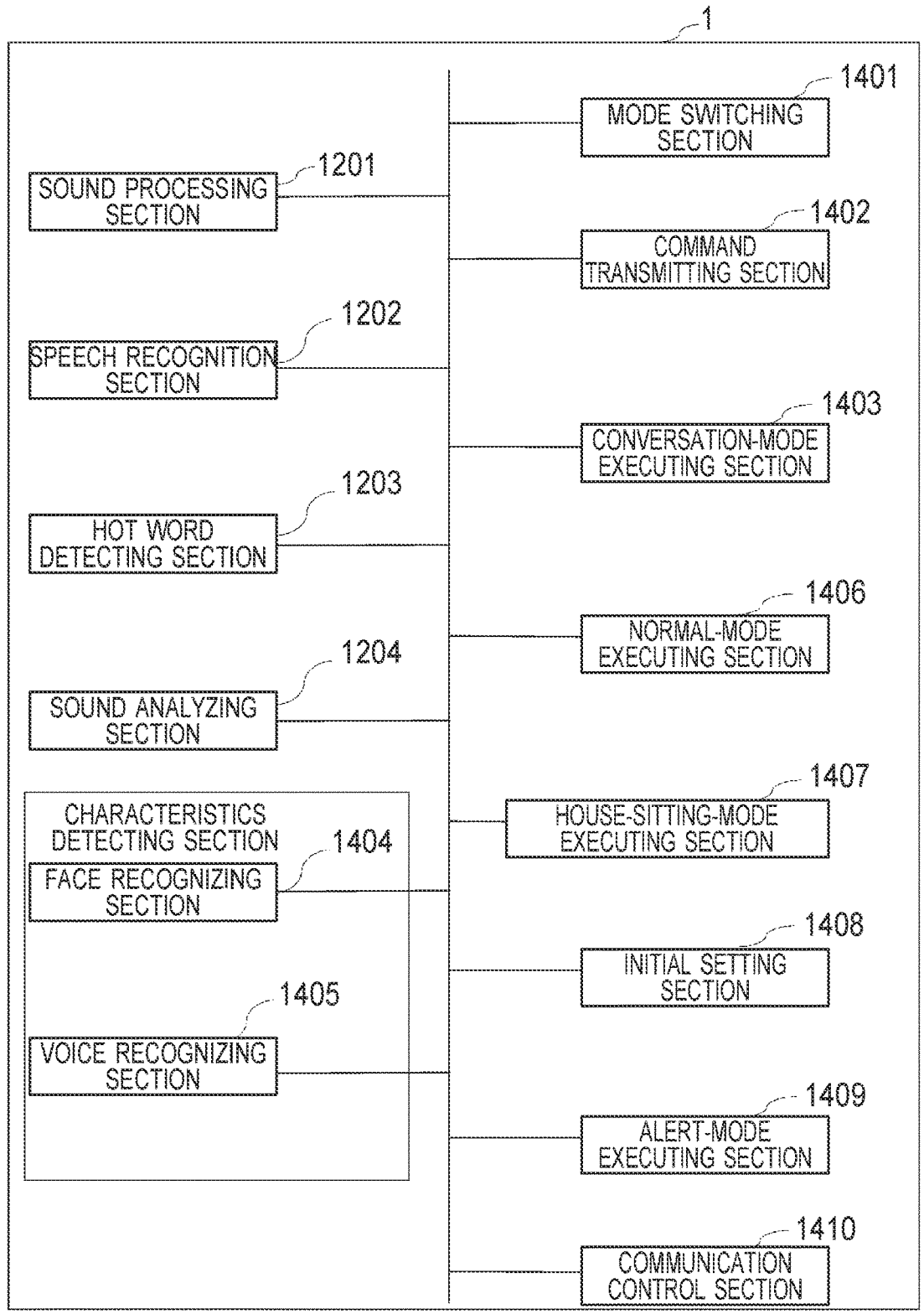
FIG. 2 is a functional block diagram of the speech recognition device.

FIG. 2 is a functional block diagram of the speech recognition device 1.

The speech recognition device 1 includes a sound processing engine 120. The sound processing engine 120 mainly includes a sound processing section 1201, a speech recognition section 1202, a hot word detecting section 1203, a sound analyzing section 1204, and a characteristics extracting section 1205.

The sound processing engine 120 realizes the function of the sound processing engine 120 by the CPU 101 reading out a sound processing program retained in the reference memory 1032, loading the sound processing program onto the internal memory 1031, and executing a process following the sound processing program.

Specifically, if a person says something to the speech recognition device 1, the voice is taken in through the sound input section 107, and the voice (analog data) is converted into sound data formed with digital data.

The sound processing section 1201 performs adjustments and the like such as cancellation of ambient noises included in the sound data.

The speech recognition section 1202 performs a speech recognition process of converting the sound data into character string data.

The hot word detecting section 1203 judges whether the character string data is character string data including a predetermined word (hereinafter, referred to as a "hot word") for asking for the start of operation on the speech recognition device 1 or for the activation of the speech recognition device 1 by reversion from a waiting state or the like.

Figure 3A:
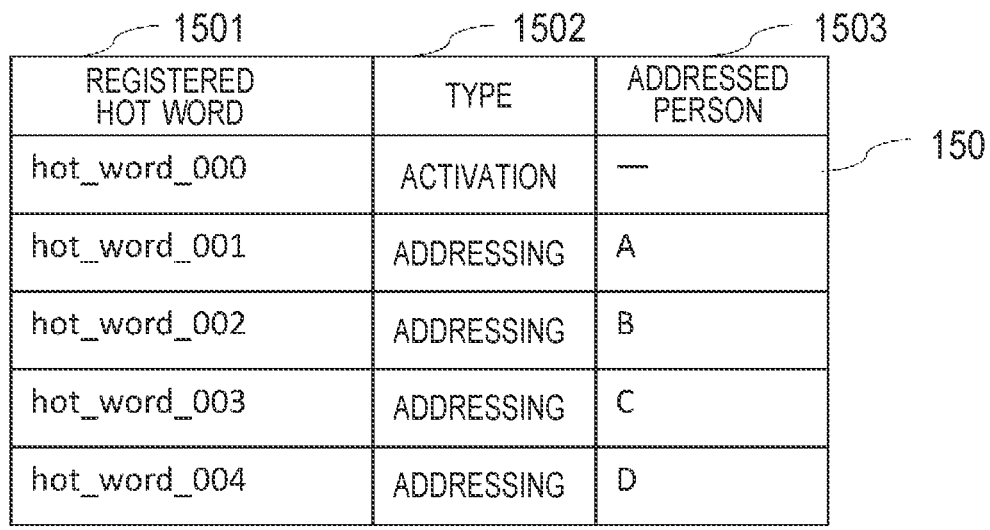
FIG. 3A is a figure illustrating an example of hot word data stored on a reference memory.

FIG. 3A is a figure illustrating an example of hot word data 150 stored on the reference memory 1032. The hot word data 150 is data in which registered hot words 1501, types 1502 defining operation on the speech recognition device 1 that are instructed with the registered hot words 1501, and addressed people 1503 defining device-specific information specifying speech recognition devices 1 to be addressed by using the registered hot words 1501 are associated with each other. The hot word detecting section 1203 performs detection of a hot word on the basis of whether the character string data is described in the hot word data 150.

The sound analyzing section 1204 decides response data or a control command corresponding to an interpretation of content spoken to the speech recognition device 1, that is, the character string data, outputs the response data through the sound output section 108 or outputs the control command to the CPU 101, and causes the CPU 101 to execute a process indicated by the sound data. For example, an example of the control command is a command to play particular music.

The speech recognition section 1202 may be included not in the speech recognition device 1, but in an external server 201 (see FIG. 4) connected to the speech recognition device 1, and the speech recognition process may be executed on the external server 201. Thereby, the load of the speech recognition device 1 can be reduced. In a case where the speech recognition process is executed on the speech recognition device 1, the amount of data communication with the external server 201 can be reduced.

In addition, a characteristic function of the speech recognition device 1 according to the first embodiment is that, other than being able to operate singly as conventional speech recognition devices can, it allows conversation by transferring spoken sounds to other speech recognition devices 1 that are on a private communication network (hereinafter, a home LAN 210: see FIG. 4 for example) installed in a predetermined space such as a house or a building. Accordingly, the hot word detecting section 1203 detects a hot word that is a cue for switching to a conversation mode for having conversation. Furthermore, the speech recognition device 1 has the characteristics extracting section 1205 that extracts vocal or visual characteristics from a person who can join conversation via the home LAN 210, and performs judgement about consistency with registered data.

Figure 3B:
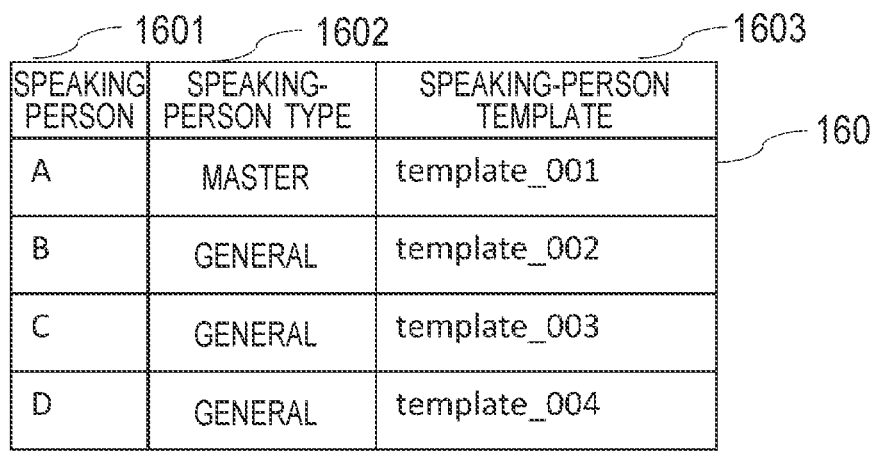
FIG. 3B is a figure illustrating an example of voice authentication data stored on the reference memory.

FIG. 3B is a figure illustrating an example of voice authentication data 160 stored on the reference memory 1032.

The voice authentication data 160 is data in which a speaking person 1601 as information that uniquely specifies a person who can join conversation via the home LAN 210, a speaking-person type 1602 indicating an attribute of the speaking person, for example whether a speaking person is "Master" authorized to perform setting of the speech recognition device 1 or the communication network or "General" not authorized to perform setting, but authorized only to join conversation on the home LAN 210, and a speaking-person template 1603 indicating vocal characteristics of the individual are associated with each other.

Figure 4:
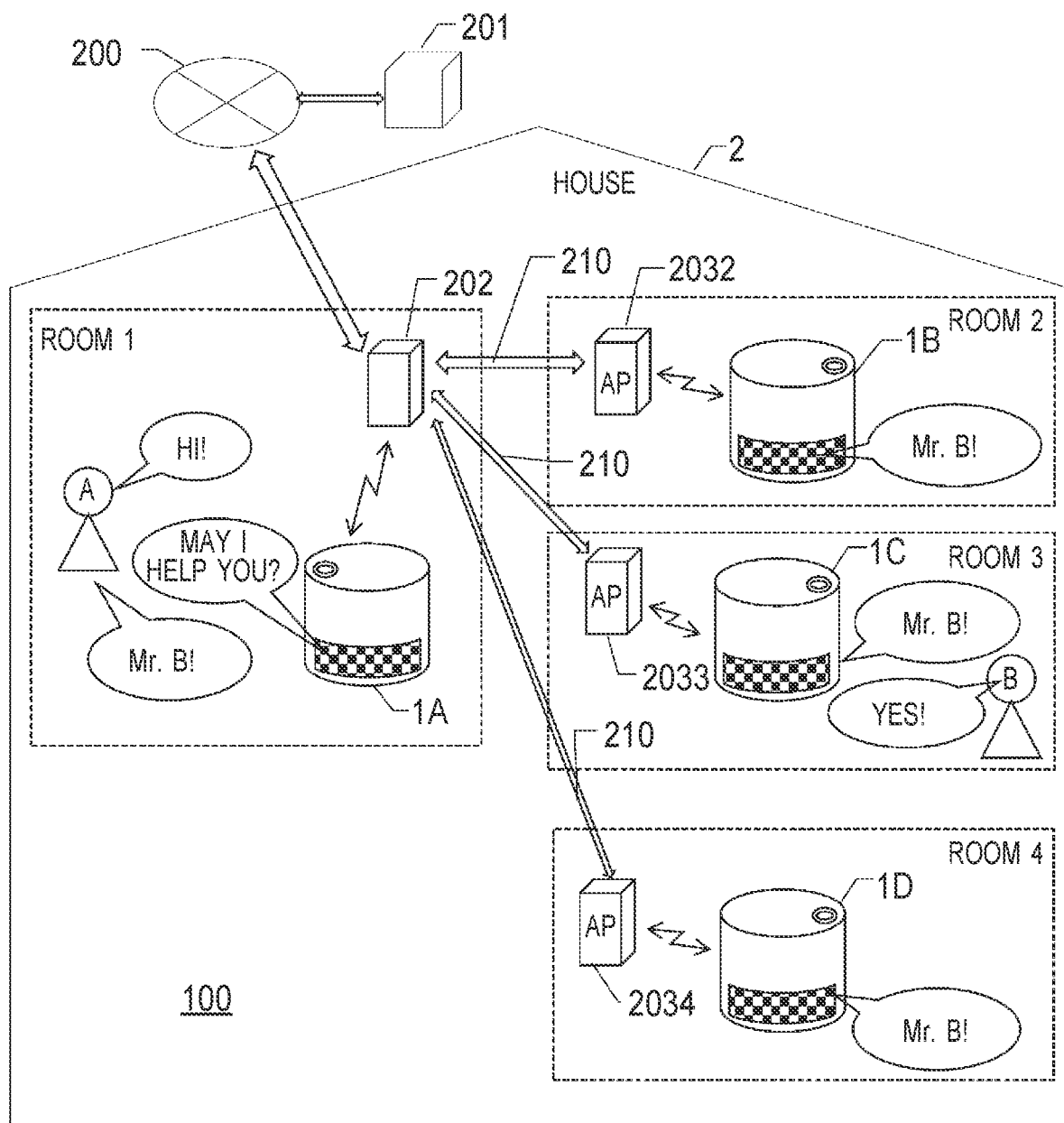
FIG. 4 is a figure illustrating a coordination system using speech recognition devices.

FIG. 4 is a figure illustrating a coordination system 100 using speech recognition devices 1, and illustrates one example of a case where the coordination system 100 is used at home. Note that although the coordination system 100 is used at home in this example, locations to which the present embodiment can be applied are not limited to the inside of a house, but include spaces such as offices or classrooms where particular people gather.

(First Addressing Operation)

A first speech recognition device 1A, a second speech recognition device 1B, a third speech recognition device 1C, and a fourth speech recognition device 1D that are installed in a room 1, a room 2, a room 3, and a room 4, respectively, in the house in FIG. 4 have functions identical to those of the speech recognition device 1 illustrated in FIG. 1. Here, each of the second to fourth speech recognition devices 1B to 1D that are in the rooms are connected to a router 202 installed in the room 1 via corresponding ones of a second AP 2032 to a fourth AP 2034 which are access points or radio repeaters installed in corresponding ones of the rooms 2 to 4. Then, each of the second to fourth speech recognition devices 1B to 1D is connected to the external Internet 200 via the router 202.

In the following, first addressing operation in the coordination system 100 is explained in accordance with the order of steps in FIG. 5. It is supposed that when the process of the steps is started, all of the first to fourth speech recognition devices 1A to 1D are turned on, and the sound input sections 107, and the sound processing engines 120 are activated. This state is referred to as a stand-by mode.

If Person A in the room 1 addresses the first speech recognition device 1A, the voice of Person A is taken in through the sound input section 107 of the first speech recognition device 1A, and then the hot word detecting section 1203 judges whether or not the voice represents a first hot word meaning an activation request. If the hot word detecting section 1203 judges that the addressing sound represents the first hot word (S101/Yes), sound response data of a predetermined fixed phrase like, "May I help you?" is played through the sound output section 108. The hot word detecting section 1203 outputs the first hot word to the sound analyzing section 1204, and the sound analyzing section 1204 outputs an execution command to a normal-mode executing section 1406. Thereby, the first speech recognition device 1A switches to a normal mode. The normal mode is an operation mode in which all of functions that the first speech recognition device 1A has can be executed.

If the hot word detecting section 1203 judges that the addressing sound does not represent a hot word (S101/No), the stand-by mode continues.

Next, if Person A utters an addressing phrase, "Mr. B!" to Person B who is in another room, the sound is taken in as sound data via the sound input section 107, and then is subjected to adjustments such as ambient noise cancellation at the sound processing section 1201 of the sound processing engine 120, and then the hot word detecting section 1203 judges whether or not the addressing phrase represents a second hot word (a hot word for an instruction of a request for switching to the conversation mode) (S102).

If addressing sound data, "Mr. B!" is preregistered in the hot word data 150 as a hot word, and the hot word detecting section 1203 judges that the phrase, "Mr. B!" is a second hot word (S102/Yes), the second hot word is output to the sound analyzing section 1204. Although in the present implementation aspect, a hot word to serve as a cue for switching to the conversation mode is the name of a person who is at home, this is not the sole example, and anything may be used. Other fixed phrases, for example, phrases such as "speak" or "connect," may be used.

The sound analyzing section 1204 judges through analysis that the second hot word is a request for switching to the conversation mode, and selects control commands necessary therefor (S103). The control commands that are applicable in the present example are a mode switching command to cause the first to fourth speech recognition devices 1A to 1D to switch to the conversation mode, and a sound transfer command, and a sound playing command to cause the sound data, "Mr. B!" to be transmitted from the first speech recognition device 1A to each of the second to fourth speech recognition devices 1B to 1D, and cause the sound data to be output through each sound output section 108.

A conversation-mode executing section 1403 is activated also at the first speech recognition device 1A, and the first speech recognition device 1A switches to the conversation mode (S104).

A command transmitting section 1402 of the first speech recognition device 1A transfers the addressing sound data, "Mr. B!" to the second to fourth speech recognition devices 1B to 1D via a communication control section 1410 on the basis of the sound transfer command, and transmits the mode switching command to switch to the conversation mode, and the sound playing command to each of the second to fourth speech recognition devices 1B to 1D. In addition, the command transmitting section 1402 of the first speech recognition device 1A starts measuring elapsed time since the addressing sound data has been transferred to the second to fourth speech recognition devices 1B to 1D (S105).

Each of the second to fourth speech recognition devices 1B to 1D plays the sound, "Mr. B!" through the sound output section 108 having the addressing sound data, and the conversation-mode executing section 1403 is activated to switch to the conversation mode. About the order of reproduction of the sound data, the sound may be played from the second to fourth speech recognition devices 1B to 1D simultaneously, or the sound may be output from the second to fourth speech recognition devices 1B to 1D in a predetermined order. Such a predetermined order may be, for example, an order of installation of the speech recognition devices, an order according to a priority order of rooms (see FIG. 14), or the like.

If Person B in the room 2 responds, and makes a reply according to the addressing like "Yes!" for example, the second speech recognition device 1B takes in the reply as sound data via the sound input section 107, and sends the response sound data back to the first speech recognition device 1A that is on the addressing side. At this time, the second speech recognition device 1B and Person B are associated with each other. Furthermore, association information representing that the person who is in the room 2 where the second speech recognition device 1B is Person B is registered in and shared by the first, third and fourth speech recognition devices 1A, 1C, and 1D also.

FIG. 6 illustrates one example of presence estimation data.

As an example of association registration of Person B and the second speech recognition device 1B, if the first speech recognition device 1A receives the response sound data described above, "Person B=second speech recognition device 1B" may be additionally written in presence estimation data (see FIG. 6) registered in advance in the reference memory 1032. Identification of the first to fourth speech recognition devices 1A to 1D at home may be performed by using particular identifiers such as Mac addresses of devices or IP addresses allocated to devices in the home LAN 210.

Furthermore, for registration of the presence estimation data described above, a registration request is triggered from the first speech recognition device 1A to other speech recognition devices at home, that is, the second to fourth speech recognition devices 1B to 1D, and the presence estimation data is retained in the reference memories 1032 of the second to fourth speech recognition devices 1B to 1D.

Note that in a case where the presence estimation data described above is retained already in the reference memories 1032 in the first to fourth speech recognition devices 1A to 1D, it is judged that the presence estimation data has already been registered, and the association manipulation is not performed. For registration of people, a name portion included in the addressing sound, "Mr. B!" in FIG. 2 is extracted on the sound processing engine 120 or the external server 201, and used as name data, and thereby it becomes possible to perform the association, "name of Person B=second speech recognition device 1B."

Note that a method for registration of hot words for determining to switch to the conversation mode is performed by a method mentioned below at the time of installation of a speech recognition device, like at the time of initial setting, or at the time of new registration setting.

In a case where the elapsed time measured by the timer 111 has become equal to or longer than a waiting time threshold for determining the presence or absence of a response (S106/Yes), the command transmitting section 1402 of the first speech recognition device 1A transmits, to devices that have not responded in the second to fourth speech recognition devices 1B to 1D, a command to revert from the conversation mode to the stand-by mode (S107).

In a case where there is a response with sound data from at least one of the second to fourth speech recognition devices 1B to 1D, and the response is made in elapsed time that is shorter than the time threshold (S106/No), the first speech recognition device 1A, and the device that has responded, for example the second speech recognition device 1B, stay in the conversation mode (S108).

The conversation-mode executing sections 1403 perform transmission and reception of sounds between the first speech recognition device 1A and the second speech recognition device 1B for sounds input to the sound input section 107 of the first speech recognition device 1A after the first speech recognition device 1A has switched to the conversation mode at Step S104, and sounds input to the sound input section 107 of the second speech recognition device 1B at Step S105.

If one of the first speech recognition device 1A and the second speech recognition device 1B detects a third hot word for ending the conversation mode (S109/Yes), the device that has detected the hot word, for example, the second speech recognition device 1B, switches to the stand-by mode (S110), and transmits, to the first speech recognition device 1A, a command to cause the first speech recognition device 1A to switch to the stand-by mode (S107). Upon receiving the command, the first speech recognition device 1A also switches to the stand-by mode, and the conversation mode ends.

In addition, if the second hot word is not detected at Step S102 (S102/No), the first speech recognition device 1A stays in the normal mode without switching to the conversation mode (S111), and ends the process.

Although in the example described above, association manipulation is performed with the first speech recognition device 1A, which has performed the addressing first, serving as the master device, and controlling and instructing each of the second to fourth speech recognition devices 1B to 1D in a house 2, which has been addressed, this is not the sole example, and the second speech recognition device 1B, which has been addressed and responded, may serve as the master.

As another possible association method, for example at the time of initial installation of the fourth speech recognition device 1D at home, Person D is registered in advance as a main user or operator of the fourth speech recognition device 1D. Thereby, registration of association data is triggered to the first to third speech recognition devices 1A to 1C via the home LAN 210 immediately after the installation, and "Person D=fourth speech recognition device 1D" is registered in the reference memories 1032 in the first to fourth speech recognition devices 1A to 1D.

Although, in the example described above, the first speech recognition device 1A addresses the second speech recognition device 1B, this procedure can be applied to any subset of all the speech recognition devices at home, and the procedure can similarly be performed even if a speech recognition device other than the first speech recognition device 1A addresses another speech recognition device other than the second speech recognition device 1B.

In addition, although the first to fourth speech recognition devices 1A to 1D use a wireless LAN for communication between different rooms in the example described above, they can be connected by using a wired LAN or a mobile phone line. Furthermore, it is also possible to switch to another communication mode using different interfaces only at the time of the conversation mode. For example, a wireless LAN is used during the normal mode, and another wireless system like Bluetooth may be used during the conversation mode.

(Second Addressing Operation)

When Person A and Person B have conversation after completion of the association between the speech recognition devices 1 and people in a manner like the one in the embodiment described above, the communication may be established only between the first speech recognition device 1A used by Person A and the second speech recognition device 1B used by Person B, and the communication with the speech recognition devices 1 other than those described above may be disconnected. Thereby, the confidentiality of content of the conversation can be enhanced.

For example, if Person A addresses Person B in the second and subsequent occasions, the command transmitting section 1402 of the first speech recognition device 1A establishes communication with the second speech recognition device 1B associated with Person B registered in the presence estimation data (FIG. 6) (transmits the mode switching command, and establishes communication by receiving a response to the command), and dispatches sound data to the second speech recognition device 1B.

After that, the conversation-mode executing sections 1403 allow communication of sound data only between the first speech recognition device 1A and the second speech recognition device 1B, and conversation is enabled directly between Person A and Person B. Thereby, it is no longer necessary to dispatch every piece of sound data to all the speech recognition devices at home.

If sound data as a response from Person B is not received within a predetermined length of time since addressing during the execution of the conversation mode, for example, the conversation-mode executing section 1403 of the first speech recognition device 1A judges that the conversation partner is absent now. Then, the conversation-mode executing section 1403 instructs the command transmitting section 1402 to resume communication channels with the other speech recognition devices in the house whose communication with the first speech recognition device 1A has been disconnected until then, that is, to dispatch sound data to the other speech recognition devices (the third and fourth speech recognition devices 1C and 1D), and the first speech recognition device 1A waits for a response.

Here, for example if there is a response from the fourth speech recognition device 1D in the room 4, the first speech recognition device 1A starts communication with the fourth speech recognition device 1D, and resumes conversation. In this case, the first speech recognition device 1A may not store association information of Person B and the fourth speech recognition device 1D in presence estimation data 190 of the internal reference memory 1032, but consider that Person B has temporarily moved to another location. Alternatively, the first speech recognition device 1A may create association information of Person B and the fourth speech recognition device 1D, give the association information of Person B and the fourth speech recognition device 1D a position in a priority order which is set to be lower than a position in the priority order of the association between Person B and the second speech recognition device 1B. In this case, the first speech recognition device 1A establishes connection with the other speech recognition devices in the priority order, and waits to judge the presence or absence of a response.

Furthermore, if there is not a response also from the fourth speech recognition device 1D, the first speech recognition device 1A sequentially dispatches sound data to another speech recognition device at home (the third speech recognition device 1C in the present example), and waits for a response. Then, in a case where there are no responses from the speech recognition devices in all the rooms within a predetermined length of time in the end after the sound data is dispatched to the third speech recognition device 1C, and a response is waited for, the first speech recognition device 1A judges that there are no responses, and a reply is made with a predetermined phrase such as "there were no responses," for example, to Person A who is the operator. Alternatively, instead of judgement by the first speech recognition device 1A that there are no responses from the other speech recognition devices in the manner described above, another speech recognition device may judge that there are no response sounds from Person B within a predetermined length of time, and reply with no-response information to the first speech recognition device 1A, and the first speech recognition device 1A may thereby recognize that there are no responses, and output a predetermined reply sound such as "there were no responses."

Note that the predetermined reply sound data may be stored in advance in the memory 103, or one that is retained on the external server 201 or the like on the Internet 200 may be used.

(Third Addressing Operation)

In the present example, the human sensing sensor I/F 110 of the speech recognition device 1 in FIG. 1 is connected with a human sensing sensor such as an image-capturing sensor that can check people or a human sensor that judges the presence or absence of a person, and addressing operation is perform on the basis of results of sensing by the sensor. In addition, the built-in camera 113 of the speech recognition device 1 may be used.

For example, when the first speech recognition device 1A transmits addressing sound data of Person A to the second to fourth speech recognition devices 1B to 1D in the rooms in response to addressing from Person A, the human sensing sensor provided in each of the second to fourth speech recognition devices 1B to 1D determines whether or not there is a person. A speech recognition device installed in a room where it can be determined that there are no people replies with an absence notification to the first speech recognition device 1A, and the command transmitting section 1402 receives the absence notification.

Then, the command transmitting section 1402 of the first speech recognition device 1A does not output an addressing sound to the speech recognition device that has transmitted the absence notification to the first speech recognition device 1A.

On the other hand, the command transmitting section 1402 of the first speech recognition device 1A transmits sound data to a speech recognition device that has not transmitted an absence notification to the first speech recognition device 1A, and the speech recognition device that has received the sound data plays the sound data to perform addressing. Operation after this can be performed in a similar manner to that in the case of each embodiment described before.

In addition, the person-recognition judgement described above may be performed by a typically used method. It is possible to detect the presence or absence of a person from motion of a person sensed by a human sensor that uses an infrared sensor or the like.

Furthermore, the camera 113 may be used as a human sensing sensor. Then, a face recognizing section 1404 may judge the presence or absence of a person by extracting characteristics (e.g. a facial image) of a person from an image captured by the camera 113. Furthermore, face authentication data in which facial images and people are associated may be collated with information about correspondence with people retained in the reference memory 1032 in advance to thereby judge whether or not there is a person who has been addressed in a room. If the person who has been addressed is captured by the camera 113, and it can be determined that the person is in a room, conversation between Person A and Person B is enabled by communication connection between the first speech recognition device 1A and the second speech recognition device 1B.

(Fourth Addressing Operation)

In another implementation aspect, in a case where Person A in FIG. 4 addresses Person B, and a person other than Person B replies, addressing is performed again without establishing communication connection between the first speech recognition device 1A and the second speech recognition device 1B.

First, each of the first to fourth speech recognition devices 1A to 1D installed in the rooms retains, in the reference memory 1032 in advance, the voice authentication data 160 (FIG. 3B) of people residing in the house. The voice authentication data 160 is generated by creating speaking-person templates 1603 by using the voiceprints of people, the intonations of sounds, frequency characteristics of voice, or the like at the characteristics extracting section 1205 of the sound processing engine 120, and storing the speaking-person templates 1603 in advance as the voice authentication data 160 on the reference memories 1032 of the first to fourth speech recognition devices 1A to 1D.

The voice authentication data 160 can be registered at the time of initial setting of each of the first to fourth speech recognition devices 1A to 1D. After doing so, a voice recognizing section 1405 of the first speech recognition device 1A compares the vocal characteristics data of Person B registered in the voice authentication data 160 with the vocal characteristics of a person who has replied, and judges the person as Person B if the vocal characteristics data of Person B registered in the voice authentication data 160, and the vocal characteristics of the person who has replied are consistent with each other, and passes the judgement result to the command transmitting section 1402. By receiving the judgement result, the command transmitting section 1402 transmits, to the second speech recognition device 1B, a command to cause the second speech recognition device 1B to switch to the conversation mode.

If the voice recognizing section 1405 determines that the vocal characteristics are not consistent with each other, the voice recognizing section 1405 proceeds with the process on the basis of a judgement result that the person is not Person B.

The voice authentication data 160 may be stored in advance in each of all of the first to fourth speech recognition devices 1A to 1D in the rooms in the manner described above, and may be compared to judge whether a sound given as a response by a person in each room matches the sound of Person B that is asked for by addressing by Person A. Instead of this, the voice authentication data 160 may be stored only on the reference memory 1032 of the particular first speech recognition device 1A that serves as the master, and it may be judged on the first speech recognition device 1A whether or not whether the vocal characteristics match.

Alternatively, the voice authentication data 160 is stored in a device such as a server installed at home, and sound data sent from each of the first to fourth speech recognition devices 1A to 1D, and the voice authentication data 160 may be compared with each other to judge consistency or inconsistency.

Furthermore, the voice authentication data 160 may be stored on an external server installed outside the home, and may be used for comparison of vocal characteristics.

By judging vocal characteristics of a speaking person 1601 in the manner as in the example described above, it is possible to prevent people other than family members residing in the house, and outsiders other than people who are allowed to join conversation by being permitted by the family members from joining conversation, and it is possible to attempt to enhance the security.

In addition, in a case where characteristics of the voice of a person other than registered speaking people are detected, for example, a warning may be issued by causing the display output section 109 provided in the first speech recognition device 1A that is on the addressing side to display an alarm message, or by causing a sound like "there is a response from an outsider." to be output through the sound output section 108.

(Switch from Normal Mode to Conversation Mode: 1)

Figure 5:
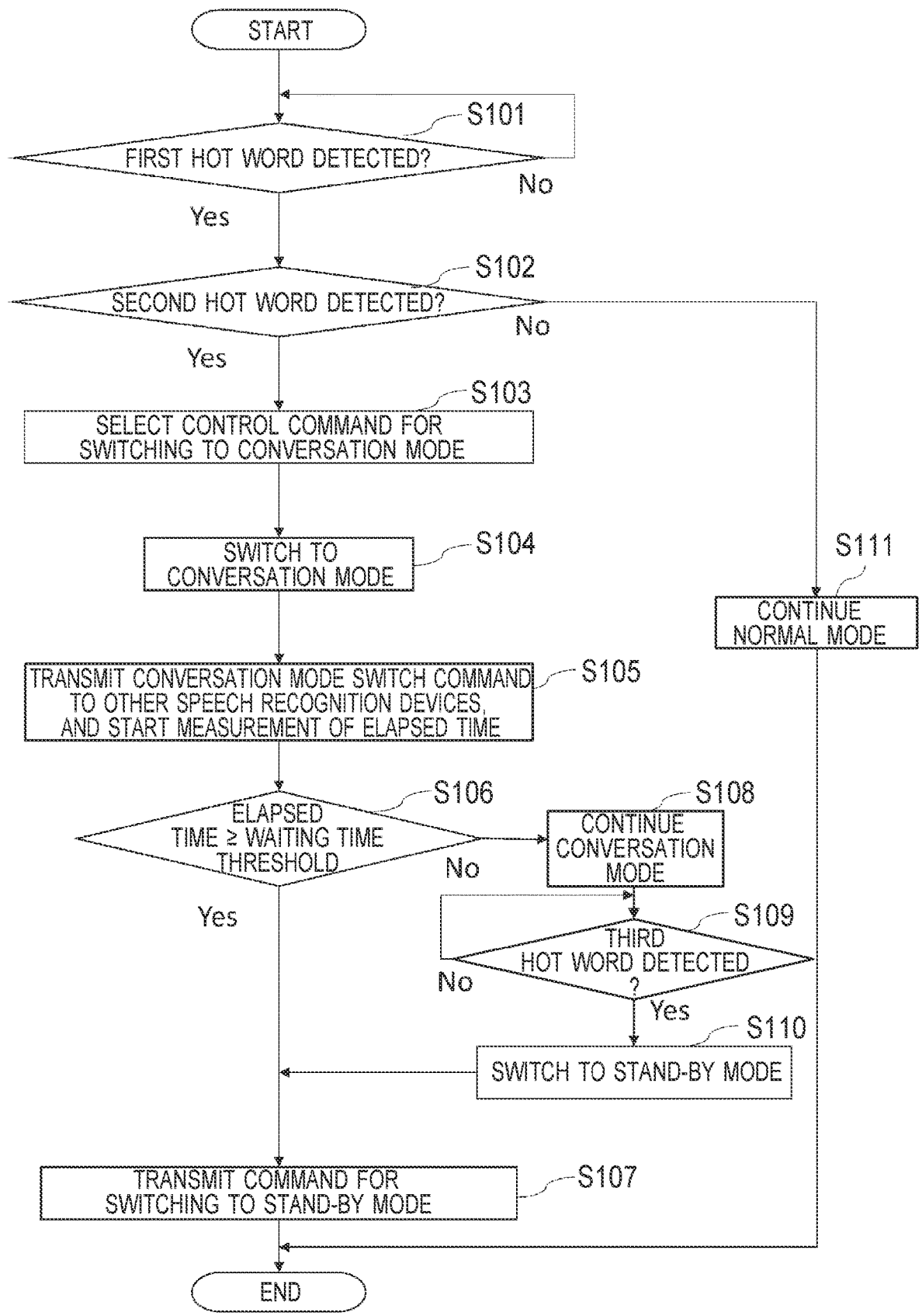
FIG. 5 is a flowchart illustrating first addressing operation in the coordination system.
Figure 7:
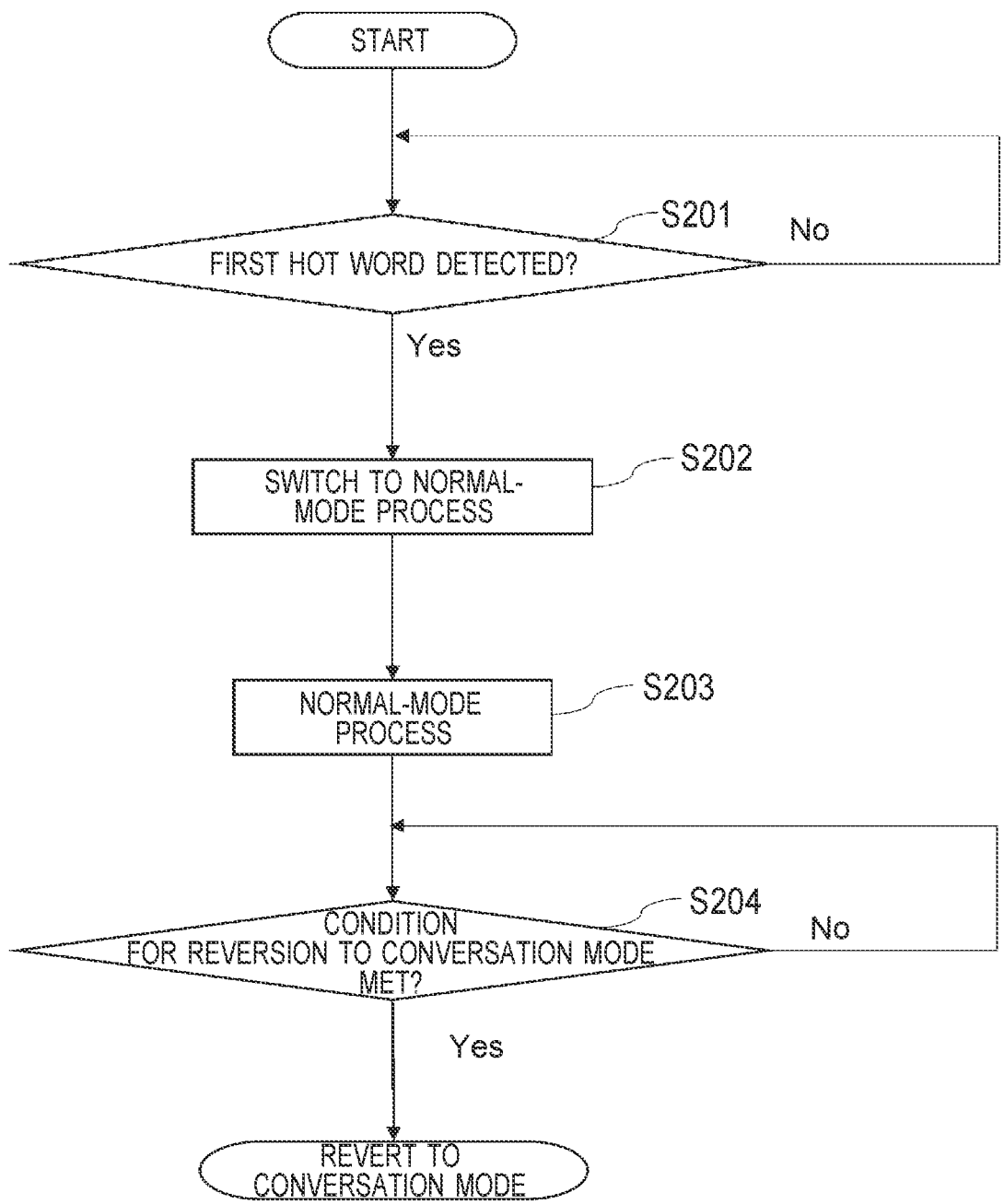
FIG. 7 is a flowchart illustrating the flow of a first switching process from normal mode to conversation mode.

FIG. 7 is a flowchart illustrating the flow of a first switching process from normal mode to conversation mode, and, on the contrary to the example illustrated in FIG. 5, the conversation mode is set as a default mode.

In the present example, after the first to fourth speech recognition devices 1A to 1D are installed, the conversation-mode executing sections 1403 are activated while the main power supplies are turned on, and the first to fourth speech recognition devices 1A to 1D are in the conversation mode in which they are waiting for addressing from an operator to another person. If a hot word for switching the mode, for example a predetermined phrase such as "mode change." is uttered by an operator at this time (S201/Yes), a mode switching section 1401 switches the mode to the normal mode (S202), and the normal-mode executing section 1406 is activated (S203).

In a case where the hot word for switching the mode is not detected at Step S201 (S201/No), the conversation-mode executing section 1403 maintains the conversation mode.

While a condition for reversion to the conversation mode is not met (S204/No), the normal-mode executing section 1406 maintains the normal mode.

If the condition for reversion from the normal mode to the conversation mode is met (S204/Yes), the conversation-mode executing section 1403 is activated again, and reverts to the conversation mode. As the reversion condition, a hot word for causing reversion may be set, or reversion may be caused if there is not a response from an operator within a predetermined length of time.

(Switch from Normal Mode to Conversation Mode: 2)

Figure 8:
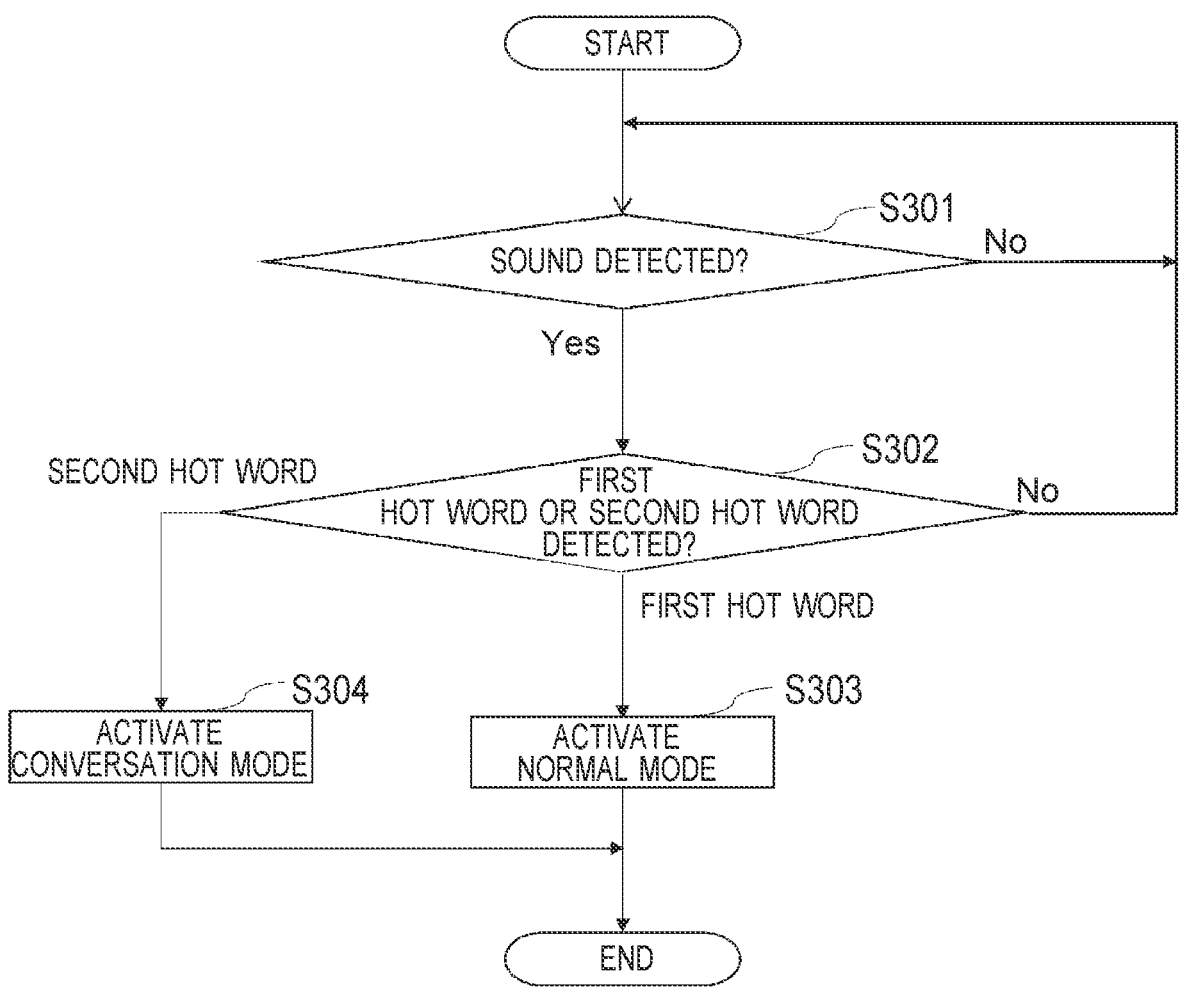
FIG. 8 is a flowchart illustrating the flow of a second switching process from normal mode to conversation mode.

FIG. 8 is a flowchart illustrating the flow of a second switching process from normal mode to conversation mode.

In the present example, in the speech recognition device 1, the sound input section 107 is activated in the beginning, and keeps monitoring only whether a sound is present or absent (S301/No). If the sound input section 107 detects a sound (S301/Yes), the hot word detecting section 1203 judges whether the detected sound represents a first hot word for requesting activation of the speech recognition device 1 (requesting the activation of the normal mode) or a second hot word for requesting the activation of the conversation mode (S302). If the uttered sound represents neither the first hot word nor the second hot word (S302/No), the process returns to the sound detection process.

In a case where the first hot word is detected (S302/first hot word), the normal-mode executing section 1406 is activated (S303). For example, in a case where a nickname that is set for activating the speech recognition device 1 is called, the speech recognition device 1 performs processes in the normal mode from then on.

In addition, in a case where the second hot word is detected (S302/second hot word), the conversation-mode executing section 1403 is activated (S304). For example, in a case where the name of a family member or a person at home is called, it is judged that the conversation mode is requested, and the speech recognition device 1 performs processes in the conversation mode from then on.

The first hot word and the second hot word may be preset, and may be changed to hot words that are convenient for an operator to use after installation. The hot-word changing setting can be implemented through application software dedicated for setting operation installed on smartphones or personal computers. Alternatively, a master operator 501 may be decided in advance, and the voice of the master operator 501 may instruct the first to fourth speech recognition devices 1A to 1D to change hot words, or may instruct a master speech recognition device, for example the first speech recognition device 1A, to give an instruction for changes to other slave devices at home, for example the second to fourth speech recognition devices 1B to 1D. At this time, only in a case where the voice of the master operator 501 is recognized, hot words are allowed to be changed. Thereby, it is possible to prevent the hot words from being changed easily. Setting of the voice of the master operator 501 is performed through an application prepared as a dedicated application for the setting on smartphones or personal computers, and registration of voice is performed through the application. The voice of the master operator 501 may be registered in the reference memory 1032 by creating vocal characteristics data at the characteristics extracting section 1205 in the sound processing engine 120 of the first speech recognition device 1A, or may be registered in the reference memory 1032 by creating the voice authentication data 160 on a smartphone or a personal computer. Furthermore, in a case where there is a home server 601 connected with a home network environment, vocal characteristics data is stored on the home server 601, and characteristics of voice used for addressing, and characteristics of voice in the stored data may be checked through comparison with each other while the server and the speech recognition device operate in a coordinated manner.

(Setting at the Time of New Installation 1)

Figure 9:
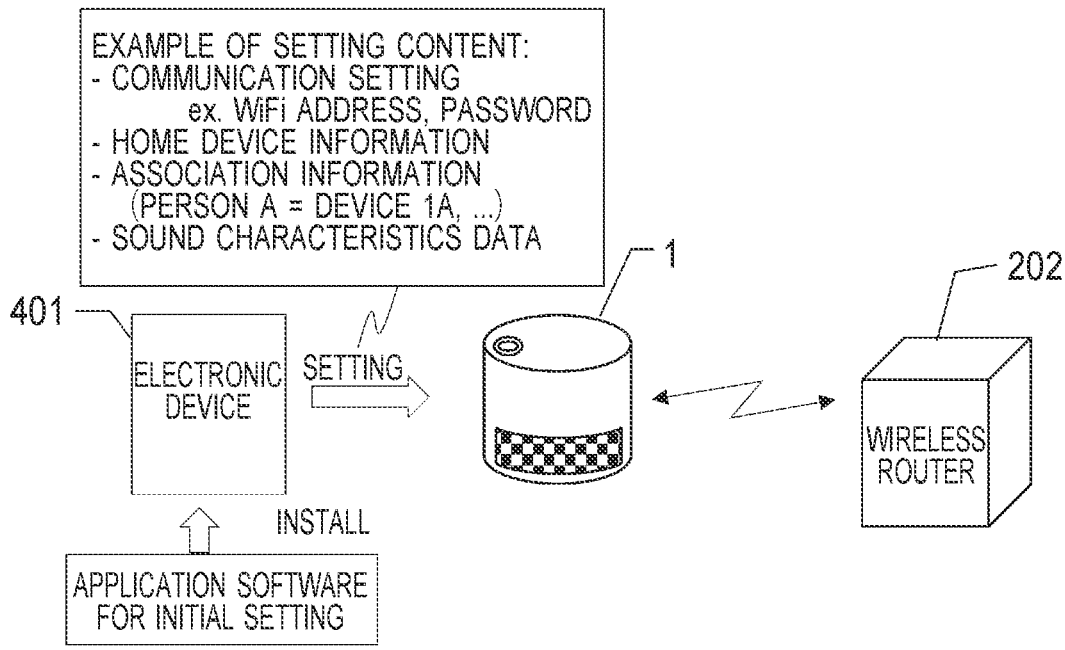
FIG. 9 is a conceptual diagram illustrating a first setting process at the time of new installation.

FIG. 9 is a conceptual diagram illustrating a first setting process at the time of new installation.

When a speech recognition device 1 is installed newly at home, dedicated application software (application software for initial setting) 410 is installed on an electronic device 401 like a smartphone or a personal computer. Then, setting for network connection with the home router 202 and the like, device registration in a case where there is a speech recognition device 1 having already been installed, and setting related to association data about correspondence between people such as family members at home, and speech recognition devices 1, the voice authentication data 160 of people such as family members, and the like are performed. In this example, the setting for connection between the newly installed speech recognition device, and a communication device at home like a wireless router, for example, is performed by using a method of setting by using a smartphone, a personal computer or the like as described above, or by using an automatic setting method like WPS (WiFi Protected Setup).

In addition, for the correspondence described above between people and speech recognition devices 1, setting of association like Person A as the main user of the first speech recognition device 1A, and Person B as the main user of the second speech recognition device 1B is performed on the application software described above on a smartphone, a personal computer, or the like.

Furthermore, the voice authentication data 160 of people may be read out from data stored on an existing device, for example the third speech recognition device 1C, and shared, or may be managed on the electronic device described above, and the data may be set.

(Setting at the Time of New Installation 2)

Figure 10:
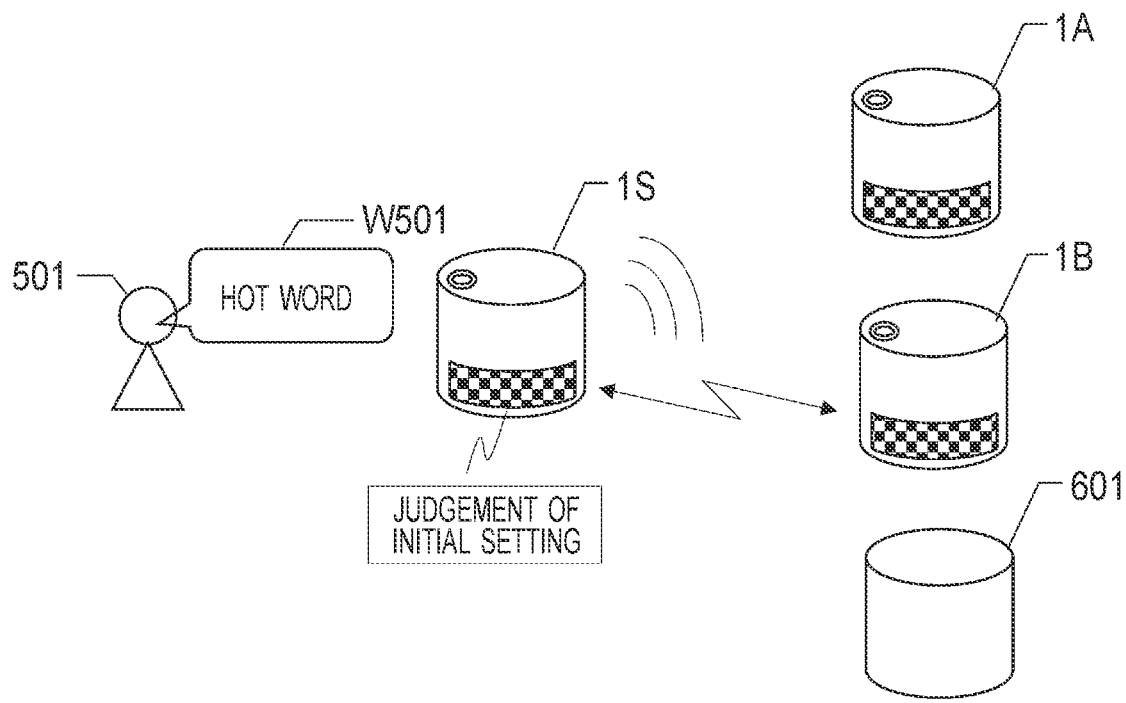
FIG. 10 is a conceptual diagram illustrating a second setting process at the time of new installation.
Figure 11:
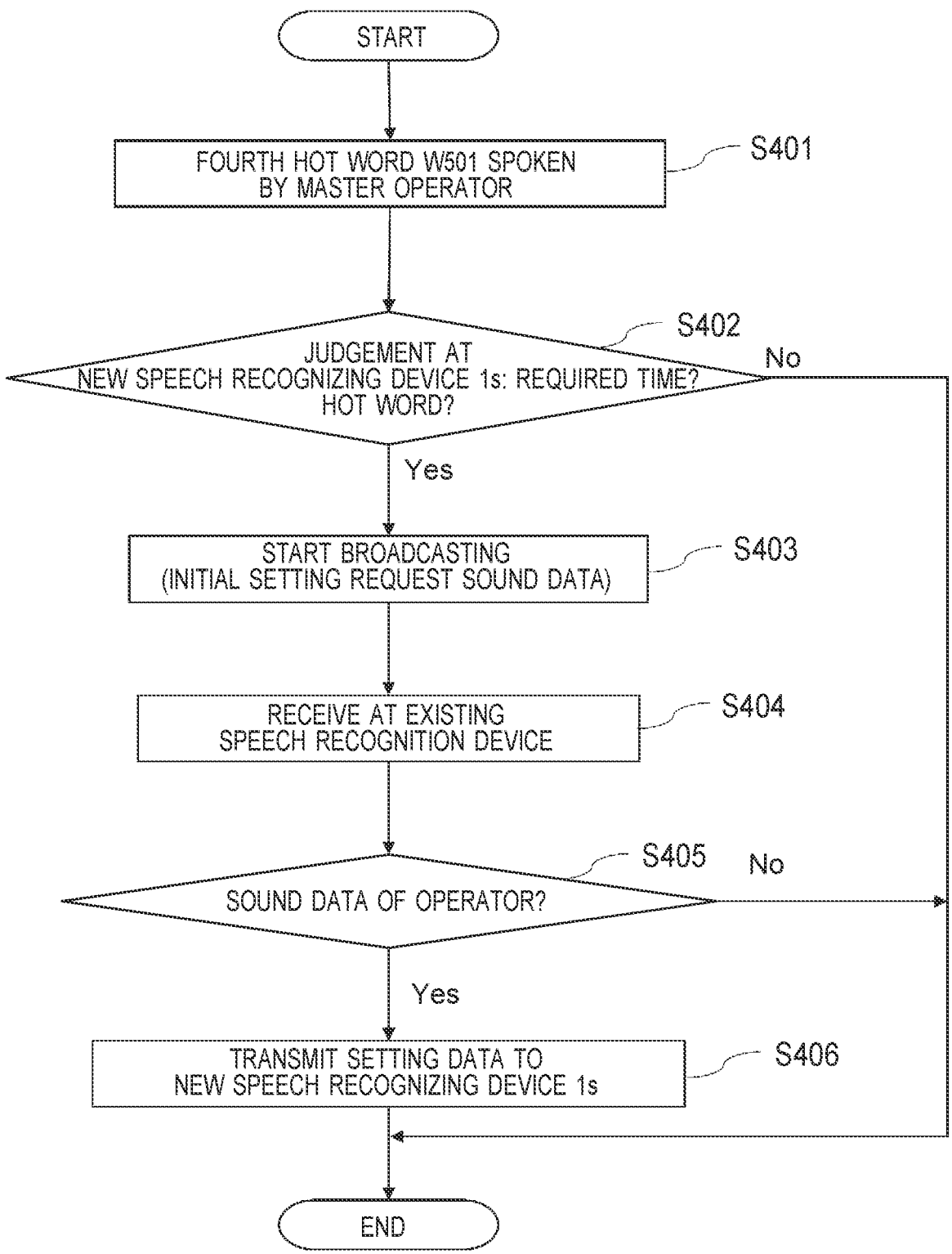
FIG. 11 is a flowchart illustrating the flow of a second setting process at the time of new installation.

FIG. 10 is a conceptual diagram illustrating a second setting process at the time of new installation, and FIG. 11 is a flowchart illustrating the flow of the second setting process at the time of new installation.

In this example, the master operator 501 authorized to perform setting of communication devices at home performs connection setting of a new speech recognition device 1S by sounds.

First, the master operator 501 starts speaking to the new speech recognition device 1S, and the sound input section 107 receives the sound input. Thereby, the connection setting process is started, and the timer 111 starts measurement (S401).

If the hot word detecting section 1203 of the new speech recognition device 1S detects a fourth hot word W501 for initial setting (S402/OK), an initial setting section 1408 of the new speech recognition device 1S starts an initial setting process. Specifically, the initial setting section 1408 transmits sound data of the master operator 501, and initial setting request data to existing devices at home, for example the first to fourth speech recognition devices 1A to 1D and the home server 601 (S403). The transmission process up to this point is performed within a predetermined length of time (S404).

The purpose of limiting a length of time within which the transmission process should be performed is for reducing the possibility that the initial setting request data, and the sound data of the master operator 501 that are diffused outside the home and the like at the time of the transmission are tapped.

The transmitted request data, and sound data are received by the first to fourth speech recognition devices 1A to 1D that are already at home (S403).

The characteristics extracting section 1205 of each of the first to fourth speech recognition devices 1A to 1D examines whether the sound data transmitted on the basis of the broadcasted initial setting request data described above is the sound data of the master operator 501 (S405). The characteristics extracting section 1205 extracts vocal characteristics data from each of a speaking-person template indicating sound characteristics of the master operator 501 retained in the reference memory 1032 of each of the first to fourth speech recognition devices 1A to 1D, and the broadcasted sound data, and compares the vocal characteristics data with each other. If there is consistency (S405/OK), initial setting is executed on the new speech recognition device 1S (S406), and the connection setting process is ended.

In a case where a result of the judgement at Steps S402 and S405 is NG (S402/NG) or (S405/NG) also, the present process is ended.

The initial setting is executed by the master speech recognition device that are in the first to fourth speech recognition devices 1A to 1D, and centrally controls all the speech recognition devices at home. The role of the master speech recognition device is played for example by a device installed in a living room or the like in the home (a speech recognition device that is relatively frequently used by family members) or a device that was installed at home first. Alternatively, the master speech recognition device may be one that the master operator 501 has set as the master speech recognition device.

Alternatively, as the master device, the home server 601 at home may execute the examination of sound data described above, and the initial setting of newly connected devices described above. In a case where the examination of sound data is performed at the home server 601, the sound data of the master operator 501, and the initial setting request data are received by the first to fourth speech recognition devices 1A to 1D having already been installed, and transferred to the home server 601, or received by the home server 601 itself. Then, the home server 601 has stored therein sound templates which are the vocal characteristics data of the master operator 501, and performs examination of whether there is consistency between speech characteristics. If there is consistency, the home server 601 instructs the new speech recognition device 1S to perform various types of setting for communication such that connection to the home LAN 210 is enabled.

Second Embodiment

Figure 12:
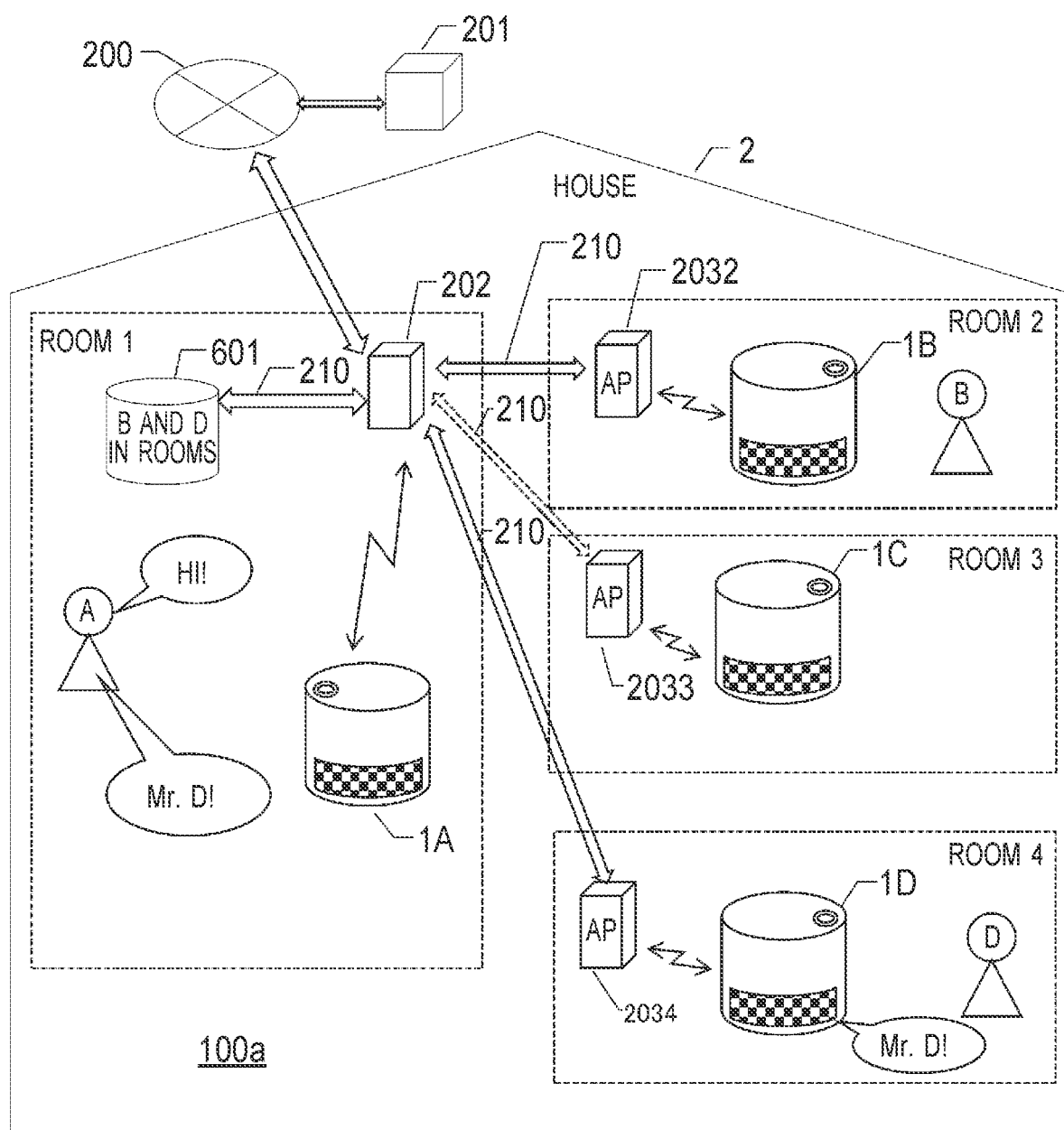
FIG. 12 is a figure illustrating the schematic configuration of a home speech-recognition-device coordination system in a second embodiment.

In the present embodiment, a home conversation system that uses speech recognition devices 1 further includes a home server device. FIG. 12 is a figure illustrating the schematic configuration of a coordination system 100a for speech recognition devices 1 in a house in a second embodiment.

A difference from FIG. 4 is that the system has the home server 601 on the home LAN 210. The home server 601 retains sound data of people at home, and the voice authentication data 160 including speech characteristics points. Then, by using sound data sent from each of the first to fourth speech recognition devices 1A to 1D, and data notifying the presence or absence of a person, the home server 601 always monitors which devices among the first to fourth speech recognition devices 1A to 1D people at home are close to.

Thereby, even in a case where Person A calls Person D in FIG. 12, the first speech recognition device 1A that receives the addressing by Person A acquires, from the home server 601, information of a speech recognition device that is determined to be closer to Person D (fourth speech recognition device 1D).

Then, sound data is dispatched from the first speech recognition device 1A only to the fourth speech recognition device 1D, and conversation becomes possible only with a speech recognition device close to the person that Person A wishes to call, without checking the presence of a conversation partner every time.

In FIG. 12, those who are in rooms are Person B in the room 2, and Person D in the room 4. Each of the first to fourth speech recognition devices 1A to 1D knows the situation related to the presence of a person in a corresponding room by the human sensing sensor I/F 110 provided to itself, and transmits a result of the sensing to the home server 601. Therefore, by inquiring, of the home server 601, which speech recognition device has sensed a person, the first speech recognition device 1A prioritizes communication connection with the second speech recognition device 1B and the fourth speech recognition device 1D that are in the room 2 and the room 4.

Furthermore, by the home server 601 collecting information such as the presence or absence of a person or the presence or absence of sound, it is possible to always know who is in a room, and in which room the person is. In this manner, the destination of dispatch of data for addressing Person D from the first speech recognition device 1A can be checked at the home server 601, and the addressing data can be dispatched to the fourth speech recognition device 1D in the room 4 where Person D is.

Next, by Person D responding to the addressing played on the fourth speech recognition device 1D, communication connection between the first speech recognition device 1A and the fourth speech recognition device 1D is established, and conversation between Person A and Person D becomes possible.

Note that although the home server 601 knows the situation related to the presence of a person in a room by using the human sensing sensor provided to each of the first to fourth speech recognition devices 1A to 1D in the example described above, instead of this or in addition further to this, data about the usage of each speech recognition device may be used.

FIG. 13 is a figure illustrating one example of usage data 170 that is a record of usage in different time periods for Person A. In addition, FIG. 14 illustrates one example of call priority order data 180 in different time periods for Person A decided on the basis of the usage data 170. In addition, although not illustrated, similar data is created also for other people.

The reference memory 1032 of each of the first to fourth speech recognition devices 1A to 1D stores the usage data 170, and the call priority order data 180. For example, if Person A is addressed, and the first speech recognition device 1A responds, each of the first to fourth speech recognition devices 1A to 1D updates the usage data 170, and call priority order data 180 stored on itself by writing a response record and a call priority order in the usage data 170, and the call priority order data 180.

Furthermore, the first speech recognition device 1A broadcasts the updated usage data 170, and call priority order data 180 to the home LAN 210. Each of the second to fourth speech recognition devices 1B to 1D updates the usage data 170, and call priority order data 180 stored in the reference memory 1032 of itself by using the received, updated usage data 170 and call priority order data 180.

It is supposed that, in this state, Person B calls Person A from the fourth speech recognition device 1D on Monday, at seven o'clock. The command transmitting section 1402 of the fourth speech recognition device 1D refers to the call priority order data 180, and sequentially calls in descending order of the priority order of the first to third speech recognition devices 1A to 1C excluding itself, that is, in order of the second speech recognition device 1B, the first speech recognition device 1A and the third speech recognition device 1C.

Note that the call priority order data 180 not only may be based on the usage data 170 but may be changed in accordance with designation by a user. For example, in a case where a person is known to be near a particular device in a particular time period, the call priority order data 180 may be changed temporarily, and the device may be placed first in the priority order.

In addition, for example, if it can be known in first usage data 170 that Person A uses the second speech recognition device 1B frequently on Saturday and Sunday from 8 p.m. to 8 a.m. in the next mornings, it can be attempted to establish connection in the conversation mode in accordance with a determination that Person A is likely to be in a room in that time period. The home server 601 can also perform processes considering that Person A is absent in time periods other than those described above.

(Conversation with Outside of Home)

If it is determined that Person D who has been addressed is absent in the case of the example described above, it is also possible to transfer sound data to a communication device such as a smartphone owned by Person D.

In this case, Person D, and device information such as the Internet address, line information, or a device ID of the owned communication device are registered in advance on the reference memory 1032 of the home server 601, and thereby addressing data is transferred to the communication device in accordance with the information.

When the addressing information arrives at the communication device owned by Person D, Person D is notified of the arrival by screen display, sound output, vibration, or the like. Here, by Person D responding to the notification, a call can be started between the first speech recognition device 1A at home and the communication device possessed by Person D outside the home.

If Person D does not respond to the addressing in this step either, absence notification data is issued from the home server 601 to the first speech recognition device 1A, and the first speech recognition device 1A outputs a predetermined sound such as "there are no responses now," for example, to notify that Person D is not answering.

Note that although in the examples illustrated in the embodiments mentioned thus far, the first speech recognition device 1A addresses the other second to fourth speech recognition devices 1B to 1D, this is not the sole example, and any of the second to fourth speech recognition devices 1B to 1D can address another speech recognition device. Accordingly, any speech recognition device at home can call another speech recognition device. In addition, a plurality of the speech recognition devices according to the present embodiments can be installed, and in a case where a new speech recognition device is installed, the additional installation is possible by the installation methods described above.

(Notification from Outside of Home)

Figure 15:
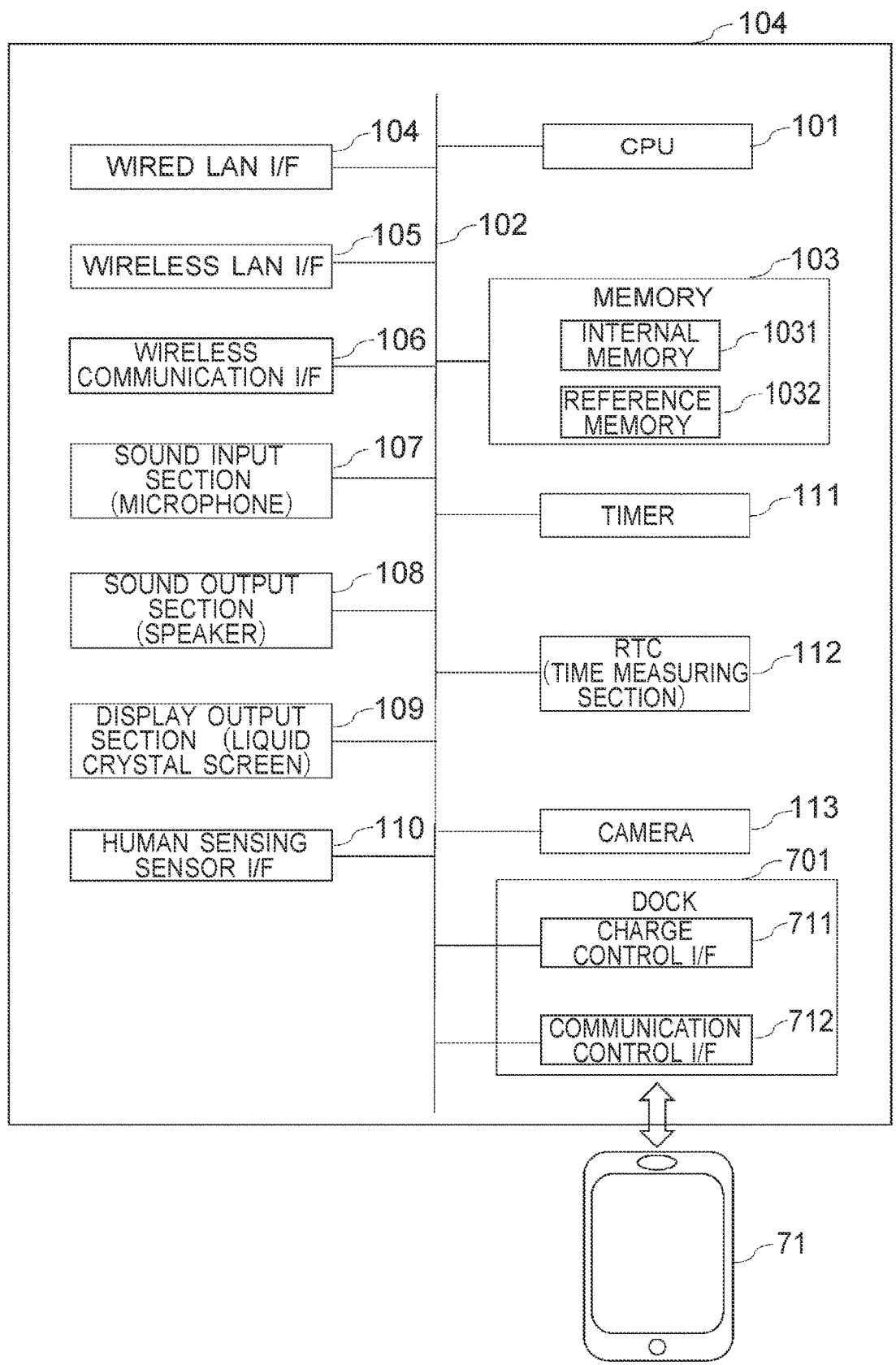
FIG. 15 is a figure illustrating an example in which a speech recognition device and a mobile communication terminal are connected through a dock.

FIG. 15 illustrates an example in which the speech recognition device 1 and a mobile communication terminal 71 are connected through a dock 701.

The speech recognition device 1 further includes the dock 701. The dock 701 includes a charge control interface 711 for charging the mobile communication terminal 71, and a communication control interface 712 for communication via a connection terminal. Specific functions can be realized by wired connection through a USB (Universal Serial Bus) or a particular mobile communication terminal interface, a wireless charging function, a wireless communication function, or the like.

In a case where there is an incoming message or call to the mobile communication terminal 71, an output is sent from the mobile communication terminal 71 to the speech recognition device 1 via the communication control interface 712, and an incoming message or call notification sound such as "Incoming Call" or "New Message" is output through the sound output section 108.

If the owner of the mobile communication terminal 71 responds by saying "play." "from who?", "what is it about?" or the like, the mobile communication terminal 71 is instructed to answer the phone or to transfer the mail content. The mobile communication terminal 71 can inform the name of the person who has made the call or sent the mail, operate as a speaker phone of the telephone, or output a sound of the mail content in the case of mail reception.

Furthermore, in a case where the owner of the mobile communication terminal 71 is not in a room, in accordance with the presence or absence of a response within a predetermined length of time, it is judged that the owner is at another location in the house, and a speech recognition device 1 that is determined to be the closest to the current location of the owner of the mobile communication terminal 71 is found by the home server 601 illustrated in FIG. 12, and an incoming message or call notification is transferred to the speech recognition device 1. On the basis of the transferred incoming message or call notification, operation similar to the call operation described above is performed.

Note that as a method of recognizing the current location of the owner of the mobile communication terminal 71, the home server 601 may use usage of individual speech recognition device 1 in the house, characteristics extraction data of voice used for speaking to the individual speech recognition devices 1, sounds picked up by the individual speech recognition devices 1, situations of connection between the docks 701 and the mobile communication terminals 71, and the like, and judge to which speech recognition device 1 people in the house are close to.

Furthermore, in a case where a device (which can be a wearable device) like the mobile communication terminal 71 that the owner usually wears can perform communication by using near field communication that allows judgement that the owner is sufficiently close to the speech recognition device 1 like connection with the dock 701, or in a case where the camera 113 of the speech recognition device 1 can check that the terminal is in the same room, it may be estimated that the terminal owner is in the room, and this may be dealt, for example, by placing the speech recognition device 1 in the room higher in the addressing priority order.

Third Embodiment (Monitoring of House when Family Members are Absent)

Figure 16:
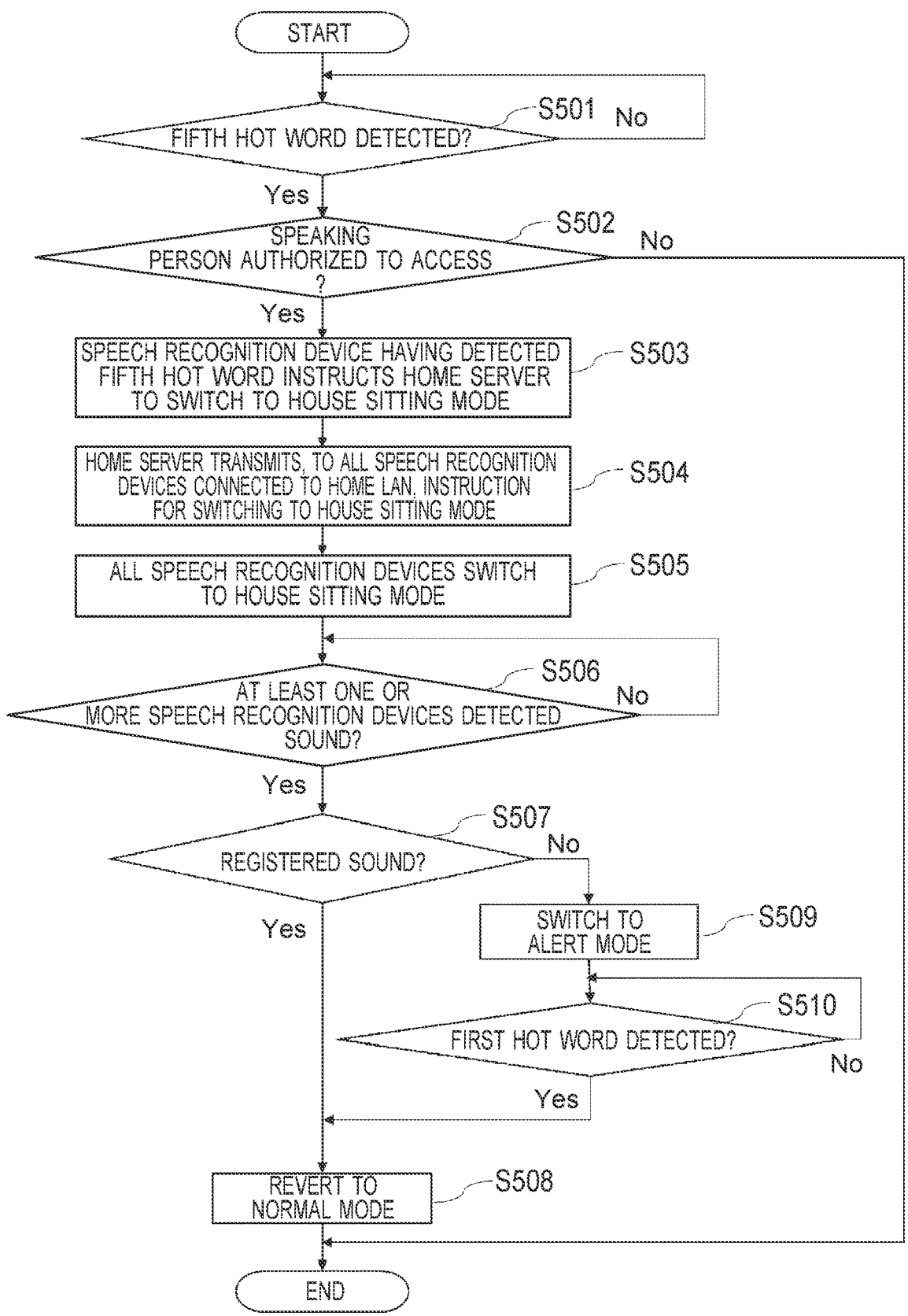
FIG. 16 is a flowchart illustrating a process for switching to a house sitting mode.

In a third embodiment, the configuration of the second embodiment illustrated in FIG. 12 is applied to another use form. The third embodiment relates to a house sitting mode. FIG. 16 is a flowchart illustrating a process for switching to the house sitting mode.

A person who is at home, and permitted access to individual speech recognition devices 1 utters a fifth hot word for switching to the house sitting mode, for example "Thanks in advance for house sitting!" If any of the first to fourth speech recognition devices 1A to 1D detects the fifth hot word (S501/Yes), the characteristics extracting section 1205 of the speech recognition device that has detected the fifth hot word compares characteristics of the voice of a person registered in the voice authentication data 160 as being permitted access to the home LAN with characteristics of the voice extracted by the speech recognition device 1, to make a judgement.

This manner of judgement can be made by using a method like those mentioned in each implementation aspect mentioned before. In addition, whichever of checking a hot word and making a judgement about whether to permit access may be performed first.

If the characteristics extracting section 1205 judges that there is consistency (S502/Yes), the command transmitting section 1402 transmits, to the home server 601, an instruction for switching to the house sitting mode (S503).

If the home server 601 receives the instruction for switching to the house sitting mode, after a lapse of a predetermined length of time since the reception, the home server 601 gives an instruction to all of the first to fourth speech recognition devices 1A to 1D at home for switching to the house sitting mode so as to cause the first to fourth speech recognition devices 1A to 1D to switch to the house sitting mode in which an abnormal-sound occurrence notification is dispatched to the home server 601 in a case where a sound with a predetermined volume or larger is sensed (S504).

Each of the first to fourth speech recognition devices 1A to 1D switches to the house sitting mode by the mode switching section 1401 provided to itself, and a house-sitting-mode executing section 1407 executes the process of the house sitting mode (S505).

If at least one or more first to fourth speech recognition device of the first to fourth speech recognition devices 1A to 1D detect a sound during the house sitting mode (S506/Yes), the characteristics extracting section(s) 1205 of the at least one or more first to fourth speech recognition devices 1A to 1D that have detected the sound perform comparison with the vocal characteristics data of people (family members) registered in the voice authentication data 160. If the detected sound is consistent with vocal characteristics data registered in the voice authentication data 160 (S507/Yes), the mode switching section 1401 causes reversion from the house sitting mode to the normal mode (S508).

If, at Step S507, the characteristics extracting section 1205 judges that the detected sound data is not consistent with the vocal characteristics data of the people (family members) registered in the voice authentication data 160 (S507/No), the mode switching section 1401 switches to the alert mode (S509), and an alert-mode executing section 1409 is activated.

The alert-mode executing section 1409 activates the alert mode, for example, activates the camera 113 provided to each of the first to fourth speech recognition devices 1A to 1D to record image data of the inside of the room, or execute a process of recording a sound sensed by the sound input section 107. In addition, abnormality occurrence information may be transmitted to the home server 601. Upon receiving the abnormality occurrence information, the home server 601 dispatches an alarm message such as a mail to the mobile communication terminal 71 such as a mobile phone or a smartphone possessed by a preregistered family member.

The family member who has received the alarm message can establish communication connection with the home server 601, and the home server 601 can receive, as sound data, sounds picked up by the sound input section 107 of the speech recognition device 1 that has sensed an abnormal sound, and dispatch the data directly to the family member to thereby allow the family member to check the situation at home.

If, during the execution of the alert mode, a condition for deactivating the alert mode is met, for example, the first hot word for instructing to revert to the normal mode uttered by a family member who has got home is detected (S510/Yes), the mode switching section 1401 deactivates the alert mode, and causes reversion to the normal mode (S508).

Although an example in which a plurality of speech recognition devices 1 are used is illustrated in the description above, a speech recognition device 1 can perform monitor operation even singly. In a case where a speech recognition device 1 operates singly, the speech recognition device 1 has the functions executed at the home server 601. Alternatively, a cloud server or the like on the Internet may be used instead of the home server 601.

According to the present embodiment, speech recognition devices 1 at home can be operated in a coordinated manner, and the alert mode can be activated on the basis of whether or not there is a sound input while family members are away from the home, and whether or not speech characteristics represent a registered sound. Thereby, entrance into the home is monitored by using the speech recognition devices 1 installed in a plurality of rooms. After an abnormality is sensed, the alert mode is executed at all the speech recognition devices 1 at home, and it is possible to track a trespasser, record behavior, and facial images, and report to family members.

In addition, in a case where an abnormal sound is detected as described above, it is also possible to output a warning sound or a warning phrase from a speech recognition device 1. A sound of a siren may be registered as the warning sound, and a phrase such as "who is this?" may be registered as the warning phrase. Thereby, it is possible to play them after an abnormal sound is sensed, and a crime prevention effect can be expected.

Although a one-to-one call between speech recognition devices is explained in the implementation aspects above, this is not the sole example, and a call mode in which one person talks with a plurality of people, and a plurality of people talk to a plurality of people is also possible. In this case, sound data of people in the conversation mode is dispatched to a plurality of speech recognition devices.

According to the present embodiment, home communication is enabled via a network such as a home network by using a plurality of speech recognition devices in a coordinated manner. That is, communication is enabled as if people were in the same room or at the same location between speech recognition devices installed in different rooms or at different locations. Accordingly, it is possible to attempt to enable smooth communication with others via speech recognition devices in different locations.

REFERENCE SIGNS LIST

1 . . . speech recognition device,
100 . . . coordination system,
100a . . . coordination system,
101 . . . CPU,
102 . . . bus,
103 . . . memory,
104 . . . wired LAN I/F,
105 . . . wireless LAN I/F,
106 . . . wireless communication I/F,
107 . . . sound input section,
108 . . . sound output section,
109 . . . display output section,
111 . . . timer,
113 . . . camera

The invention claimed is:

1. A speech recognition device comprising:
    a sound input section;
    a sound output section;
    a communication control section that performs data transmission and reception with at least two other speech recognition devices;
    a conversation-mode executing section that transmits, to each of the at least two other speech recognition devices, sound data input through the sound input section, and outputs, through the sound output section, sound data received from each of the at least two other speech recognition devices;
    a hot word detecting section that detects, from a sound input through the sound input section, a conversation activation hot word for instructing activation of the conversation-mode executing section; and
    a command transmitting section that transmits a control command to each of the at least two other speech recognition devices,
    wherein the speech recognition device further comprises a storage that stores first usage data in which a person that is permitted conversation by using the speech recognition device and a number of responses of a person through each of the at least two other speech recognition devices are associated with each other, and
    wherein when the sound input section receives an input of a sound for calling the person, the command transmitting section transmits the control command to each of the at least two other speech recognition devices in descending order of the number of responses through the at least two other speech recognition devices based on the first usage data.

2. The speech recognition device according to claim 1, wherein if the hot word detecting section detects the conversation activation hot word, the command transmitting section transmits, to each of the at least two other speech recognition devices, sound data in which the conversation activation hot word is detected, and a command to play the sound data.

3. The speech recognition device according to claim 1, further comprising:
    a storage section that stores voice authentication data in which a person that is permitted conversation by using the speech recognition device, and vocal characteristics data of the person are associated with each other; and
    a characteristics extracting section that extracts vocal characteristics data of the input sound data, and detects consistency between the vocal characteristics data and the voice authentication data,
    wherein in a case where the characteristics extracting section has detected consistency between the vocal characteristics data and the voice authentication data, the command transmitting section transmits the control command to each of the at least two other speech recognition devices.

4. The speech recognition device according to claim 1, further comprising:
    an image-capturing section;

a storage section that stores face authentication data in which a person that is permitted conversation by using the speech recognition device, and a captured image of the person are associated with each other; and a characteristics extracting section that detects consistency between a captured image captured by the image-capturing section and the face authentication data, wherein in a case where the characteristics extracting section has detected consistency between the captured image and the face authentication data, the command transmitting section transmits the control command to each of the at least two other speech recognition devices.

5. The speech recognition device according to claim 1, wherein, on a basis of human sensing information indicating that each of the at least two other speech recognition devices has sensed presence of a person, the command transmitting section transmits the control command to each of the at least two other speech recognition devices that has output the human sensing information.

6. The speech recognition device according to claim 1, further comprising a timer, wherein the sound input section receives an input of a sound for calling a particular person, and the command transmitting section:

transmits, to each of the at least two other speech recognition devices, the sound for calling the particular person, and a playing command to play the sound at each of the at least two other speech recognition devices;

acquires, from the timer, elapsed time since the sound for calling the particular person and the playing command have been transmitted; and outputs, through the sound output section, a response message for notifying that there has not been a response message from the particular person if the elapsed time has become equal to or longer than predetermined waiting time.

7. The speech recognition device according to claim 1, wherein the speech recognition device is connected to the at least two other speech recognition devices via a communication network, the sound input section receives an input of a sound for calling a particular person, the command transmitting section transmits, to all of the at least two other speech recognition devices, the sound for calling the particular person and a playing command to cause each of the at least one-two other speech recognition devices to play the sound, and if a response message from the particular person is received from a speech recognition device of the at least two other speech recognition devices, the communication control section maintains connection of communication with the at least two other speech recognition devices that has transmitted the response message, and disconnects communication with the remaining other speech recognition devices.

8. A speech-recognition-device coordination method executed at a speech recognition device connected to at least two other speech recognition devices via a communication network, the speech-recognition-device coordination method comprising:

receiving an input of a spoken sound;

detecting, from the input spoken sound, a conversation activation hot word instructing activation of a conversation mode;

transmitting a control command to each of the at least ene-two other speech recognition devices;

storing, in a storage, first usage data in which a person that is permitted conversation by using the speech recognition device and a number of responses of a person through each of the at least two other speech recognition devices are associated with each other; and when an input of a sound for calling the person is received, transmitting the control command to each of the at least two other speech recognition devices in descending order of the number of responses through the at least two other speech recognition devices based on the first usage data.

9. The speech-recognition-device coordination method according to claim 8, further comprising:

transmitting, if a conversation activation hot word is detected, to each of the at least two other speech recognition devices, sound data in which the conversation activation hot word is detected, and a command to play the sound data.

10. The speech-recognition-device coordination method according to claim 8, further comprising:

storing voice authentication data in which a person that is permitted conversation by using the speech recognition device, and vocal characteristics data of the person are associated with each other;

extracting vocal characteristics data of the input sound data, and detecting consistency between the vocal characteristics data and the voice authentication data;

transmitting, in a case where consistency between the vocal characteristics data and the voice authentication data is detected, the control command to each of the at least two other speech recognition devices.

11. The speech-recognition-device coordination method according to claim 8, further comprising:

storing face authentication data in which a person that is permitted conversation by using the speech recognition device, and a captured image of the person are associated with each other;

detecting a consistency between a captured image and the face authentication data;

transmitting, in a case where consistency between the captured image and the face authentication data is detected, the control command to each of the at least two other speech recognition devices.

12. The speech-recognition-device coordination method according to claim 8, wherein, on a basis of human sensing information indicating that each of the at least two other speech recognition devices has sensed presence of a person, transmitting the control command to each of the at least two other speech recognition devices that has output the human sensing information.

13. The speech-recognition-device coordination method according to claim 8, further comprising:

receiving an input of a sound for calling a particular person;

transmitting, to each of the at least two other speech recognition devices, the sound for calling the particular person, and a playing command to play the sound at each of the at least two other speech recognition devices;

acquiring, from a timer, an elapsed time since the sound for calling the particular person and the playing command have been transmitted; and outputting, through a sound output section, a response message for notifying that there has not been a response message from the particular person if the elapsed time has become equal to or longer than predetermined waiting time.

\* \* \* \* \*